United States Patent
Andre

(10) Patent No.: US 6,171,037 B1
(45) Date of Patent: Jan. 9, 2001

(54) FLEXIBLE LINK FOR SECURING TO A CARRYING STRUCTURE EACH WHEEL OF A ROAD VEHICLE LOADED ON MEANS OF CONVEYANCE

(75) Inventor: Jean-Luc Andre, Obernai (FR)

(73) Assignee: Lohr Industrie, Hangenbieten (FR)

( * ) Notice: Under 35 U.S.C. 154(b), the term of this patent shall be extended for 0 days.

(21) Appl. No.: 09/319,336

(22) PCT Filed: Dec. 9, 1997

(86) PCT No.: PCT/FR97/02241

§ 371 Date: Jul. 6, 1999

§ 102(e) Date: Jul. 6, 1999

(87) PCT Pub. No.: WO98/25795

PCT Pub. Date: Jun. 18, 1998

(30) Foreign Application Priority Data

Dec. 10, 1996 (FR) .................................................. 96 15304

(51) Int. Cl.[7] ........................................................ B60P 7/08
(52) U.S. Cl. .................... 410/20; 410/10; 410/12
(58) Field of Search .................. 410/7, 10, 11, 410/12, 20, 23, 50, 97, 100; 248/499; 24/68 CD, 265 CD

(56) References Cited

U.S. PATENT DOCUMENTS

| 1,990,562 | * | 2/1935 | Otis ................................... 410/20 X |
| 2,046,855 | * | 7/1936 | Tobin .................................... 410/20 |
| 4,960,353 | * | 10/1990 | Thorndyke ............................. 410/20 |
| 4,993,898 | * | 2/1991 | Klahold ................................. 410/12 |
| 5,011,347 | * | 4/1991 | Bullock .................................. 410/9 |
| 5,108,237 |   | 4/1992 | Zankich ................................ 410/21 |
| 5,902,082 | * | 5/1999 | Kaemper ............................... 410/20 |

FOREIGN PATENT DOCUMENTS

311543A  * 4/1989 (EP) ..................................... 410/10

* cited by examiner

Primary Examiner—Stephen T. Gordon
(74) Attorney, Agent, or Firm—Davis and Bujold

(57) ABSTRACT

The flexible link is a securing strap (2) which rests on the tire (5) and is tightened with respect to two fixed points on a carrying structure (7) by which the ends of the strap are retained with fixing pieces. The surface in contact with the running tread comprises successive groups (25) of a plurality of transversal support elements (26) in the form of rollers with a central rod and widened ringed tips (28) and (29) forming contiguous rail wheels by which the strap rests on the tire. This invention is applicable in the field of transport when the load consists of road vehicles.

14 Claims, 4 Drawing Sheets

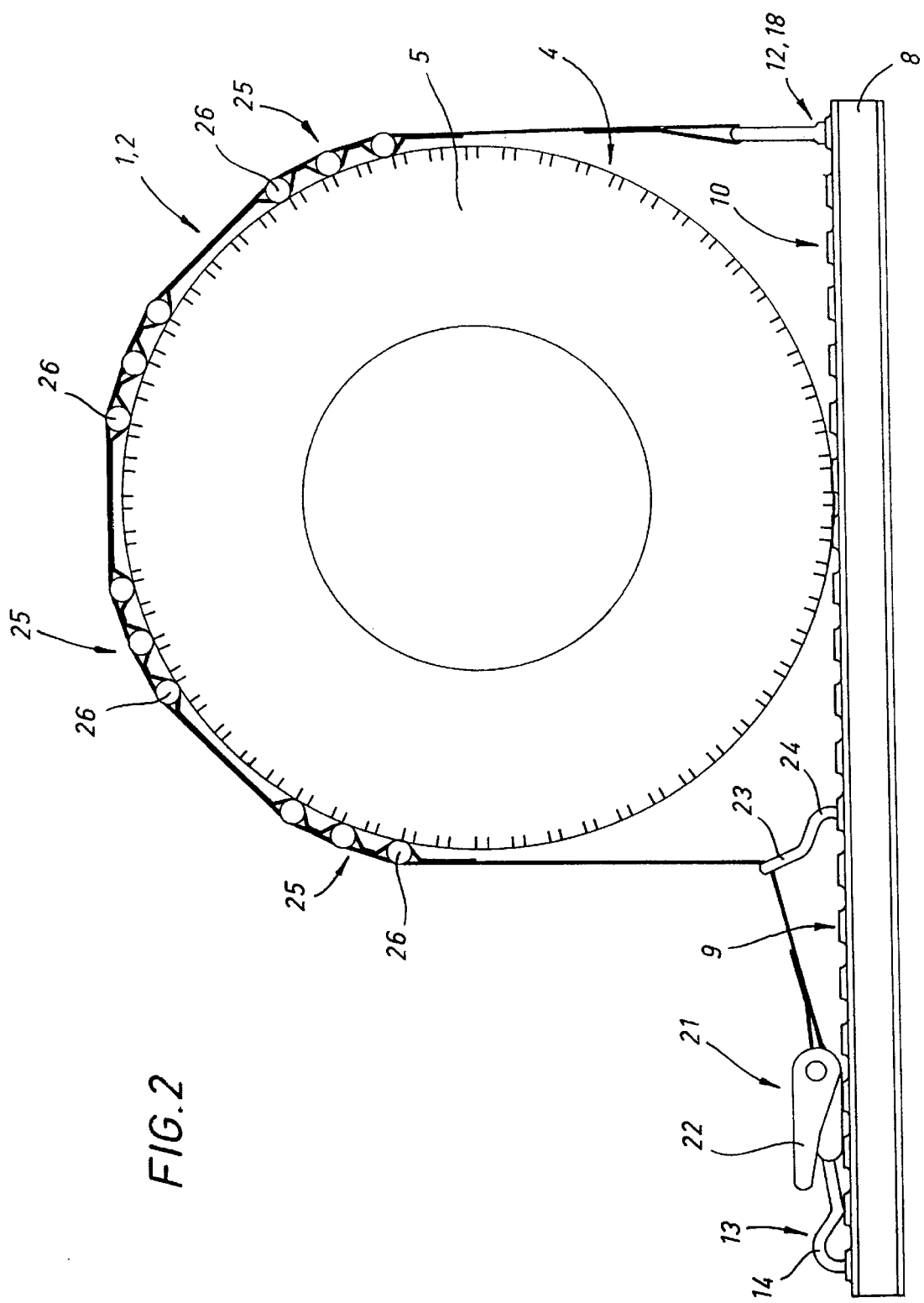

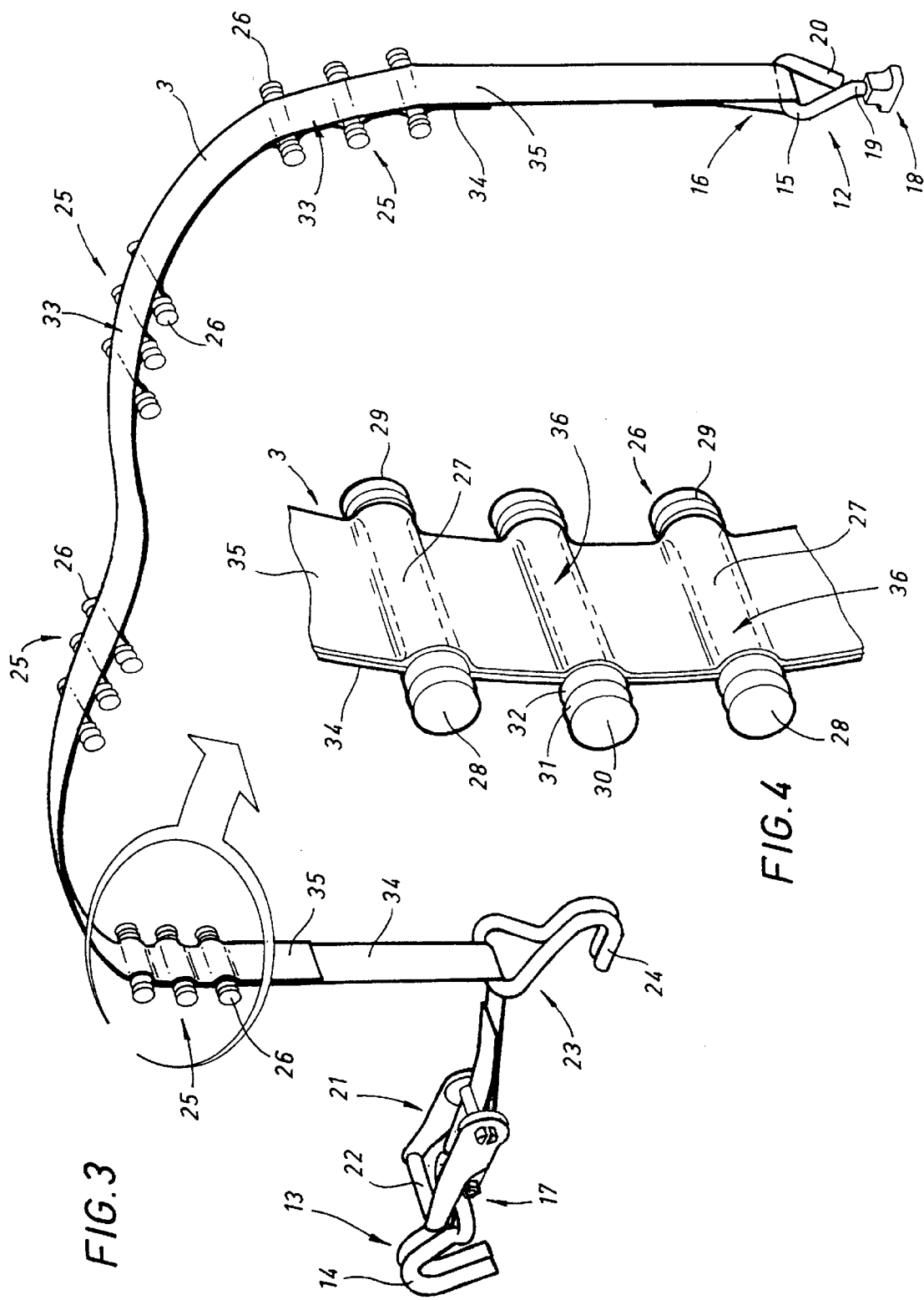

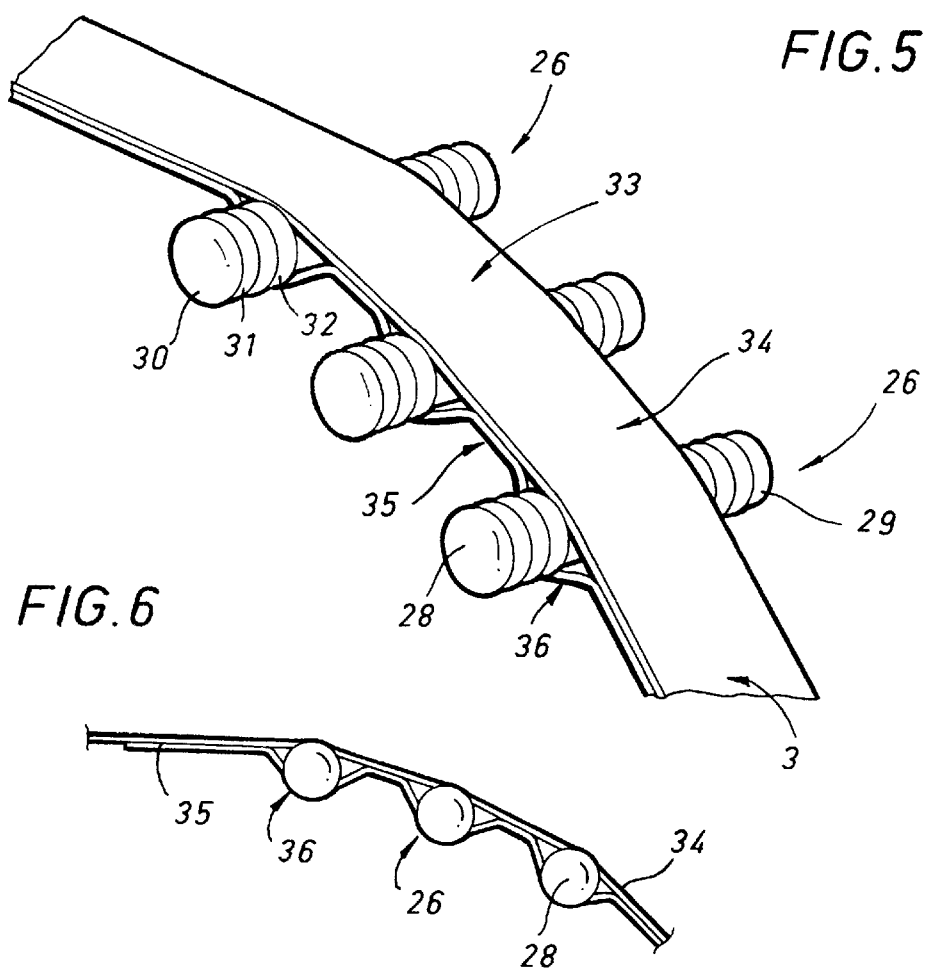
FIG. 5
FIG. 6
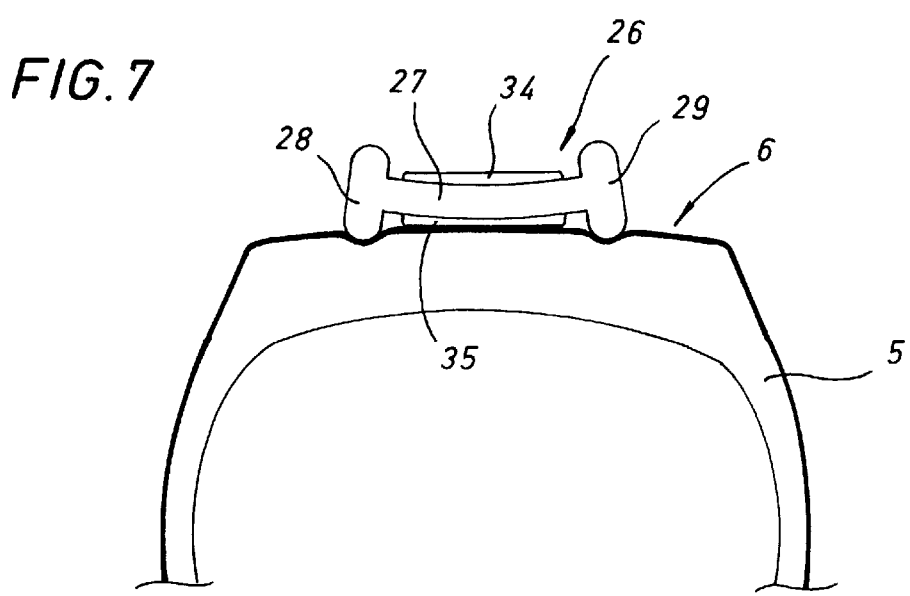
FIG. 7

FLEXIBLE LINK FOR SECURING TO A CARRYING STRUCTURE EACH WHEEL OF A ROAD VEHICLE LOADED ON MEANS OF CONVEYANCE

BACKGROUND OF THE INVENTION

Several types of straps exist for immobilizing the wheels of a vehicle on a transportation vehicle.

These consist primarily of conventional straps with locking structures attached directly to their lower surface.

These straps have fallen into disuse because they can damage the tread of the tire.

When the straps are tightened, they rub against the tire and damage it.

Another type of security strap is a strap with pads or slides. The strap rests on the tire using several anti-slip pads with lower surfaces that form blocking structures. The strap slides along the smooth upper surface of the pads when it is tightened.

During these movements, the pads remain immobile, thus eliminating the main disadvantage of the first type of strap described, which can damage the tire when the blocking structures are tightened and forcibly displaced.

However, the latter type of strap also has its disadvantages. In use, the presence of the pads makes the strap more difficult to position, requiring two hands. It is important for the pads to be correctly positioned, for if they are not, they may not function properly.

Furthermore, the force applied to the pads when tightening the strap causes the pad to become vertically embedded; in certain tires with a deep tread, this may damage the nearby projecting portions and give the tire an irregular shape. The tire damage can cause vibrations that are difficult or even impossible to eliminate.

In the case of tires on most new cars, and certain demonstration vehicles, these problems can erode consumer confidence in brand names.

SUMMARY OF THE INVENTION

The goal of the invention is to eliminate all of the disadvantages described above.

To achieve this, the invention proposes a flexible means for securing the connection of each tire to a transport vehicle, consisting of a strap with immobilizing devices that contact the tire tread, extended between two fixed points to contact the tire and force the immobilizing devices against the tire, characterized in that the immobilizing devices are transverse support elements which are supported by the strap and maintained parallel to one another, rotating freely on themselves; the extremities of the transverse support elements project transversely on either side of the strap, and the transversely projecting extremities on either side of the strap are in contact with the tire tread.

The principal advantages of the invention are as follows:
tire deterioration and deformation are eliminated because the elements rotate on themselves as they are placed in contact with the tire;
positioning the strap requires no particular skill. The positioning and tightening procedures are simple, rapid, and accomplished with one hand.
the contact elements have a simple shape, and the mechanical properties of the plastic base material provide the necessary support without causing any harm;
the support structures are removable, so the piece to be interchanged when worn or a different shape suitable for specialized tires or other purposes can be substituted;
bending the rod of the transverse support elements when pressure is exerted by the strap improves lateral maintenance; and
since the strap is formed of two bands, only the upper band is subjected to tension.

BRIEF DESCRIPTION OF THE DRAWINGS

Other features and advantages of the invention will become apparent from the following description, given by way of example, and the accompanying drawings, in which:

FIG. 2 is a profile view showing the connection of a road vehicle wheel;

FIG. 3 is a perspective view of the strap unit with its attachments;

FIGS. 4 and 5 are detailed, enlarged perspective views of a portion of the strap corresponding to a group of transverse support elements on the interior surface and the exterior surface of the strap, respectively;

FIG. 6 is a profile view of the enlarged portion corresponding to FIGS. 4 and 5;

FIG. 7 is a transverse schematic cross-section of the strap extended around a tire through a transverse support element.

DESCRIPTION OF THE PREFERRED EMBODIMENTS

Figure 1:
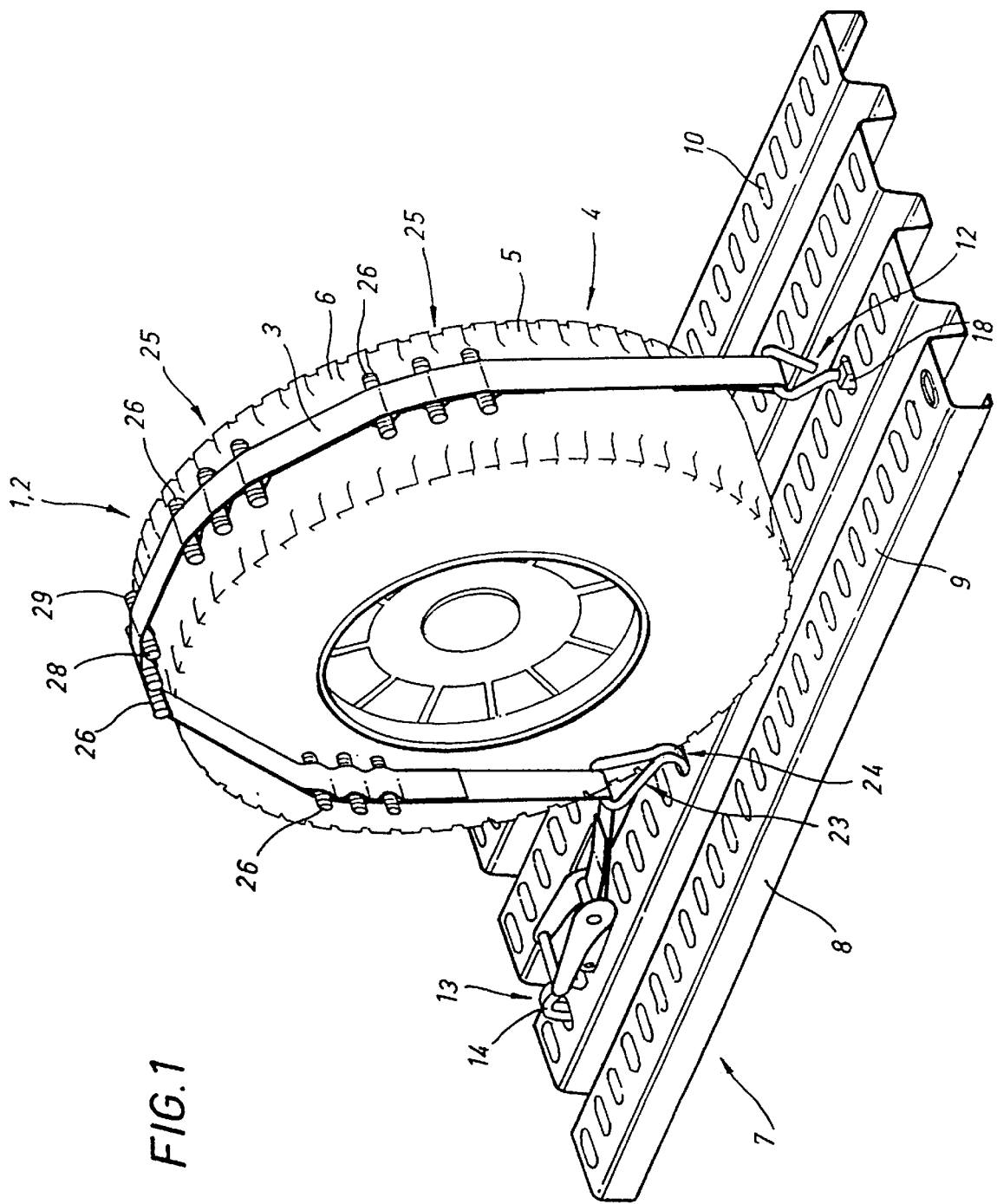
FIG. 1 is a perspective view showing the strap in place, extended around a tire on a wheel.

Strap 1 according to the invention is a flexible connection 2, for example, a strap 3 which is double or partially doubled, made of a textile material, designed to secure a vehicle wheel 4 using immobilizing contact on the tire 5 with tread 6 to assist in maintaining the vehicle on the carrying structure 7 of a transport vehicle.

By way of example, the carrying structure has a supporting surface or plate 8 made of perforated metal 9, which is either flat or formed of undulating square or rectangular segments. Perforated metal surface 9 has on one or more of its supporting surfaces oblong perforations such as perforations 10 with flat or raised edges arranged in lines, which are used as anchoring points for the attachment of anchor elements of the strap extremities or for the intermediate return element.

Anchor elements 12, 13 on the strap extremities may form a metal hook, with each of its curved extremities 14 engaging a perforation 10 of supporting structure 7, and the other extremity having a transverse portion 15 to which the strap extremity is pivotally attached with an end buckle at 16, 17.

In one possible variation, either the first hook or both end hooks could be replaced by a retaining block 18 (FIG. 3) of the same shape as the perforations, but slightly smaller in size in order to engage within the opening of the perforation and, after a quarter rotation, to serve as an anchor. Retaining block 18 pivots around connecting stem 19 extending into triangular extremity 20, forming a passageway for buckle 16 on the end of the strap.

As shown in FIGS. 2 and 3, this type of anchor would preferably be used for the first end of the strap located on the right side of the drawings.

On the end portion opposite the first extremity, the strap has a manual tightening device, for example, a catch 21 with a handle 22.

This same terminal portion is pulled down against the tire using a return ring 23 anchored with a hook 24 in an adjacent perforation 10. The strap slides along said ring so that the terminal portion near the second extremity forms a downward pointing, broken line configuration and passes close to the tire, allowing the strap to remain in contact with the tire along a longer portion of the surface (FIG. 2).

To improve tire immobilization, the strap according to the invention further comprises along its utility surface one or more groups 25, each comprising a plurality of transverse support elements such as element 26, maintained in parallel and connected to one another by the specialized strap design, as will be seen below.

The latter elements may be of various technical types and may be maintained by the strap in various ways.

The type shown in the drawings is the preferred variation.

It consists of rectilinear elements in the general shape of rollers with a rod-like central portion 27 terminating on either side in expanded, cylindrical tips 28,29 with one or more rings, for example, two or three rings 30, 31, 32, of larger diameter than the central rod-shaped portion.

Thus, the transverse support elements generally resemble barbells.

The ringed structure provides a support zone on either side of the roller for a single or multiple contact at one or more parallel, longitudinal areas near each of the enlarged extremities 28, 29.

This parallel succession of annular ridges formed by the roller extremities ensures better lateral support for the strap along the tire in relation to the lateral stress exerted upon the load being transported, for example, on turns. The rounded peripheral portions and the rounded section of each enlarged roller extremity 28, 29 exert pressure by rolling when the strap is tightened. Thus, they not only prevent damage to the tire and distortion of the tread, but also improve immobilization.

Rather than sliding along the tread surface or being forced against a single area on the tire, transverse support elements 26 act like pressure guide wheels, pressing progressively harder against the tire during the displacement-rolling caused by tightening the strap.

Thus, no further slipping or sliding occurs to cause tire deterioration.

Transverse support elements 26 may be arranged in several repetitive groups 25 spaced apart at constant intervals 33, or they may be arranged in a regular line, spaced at constant intervals along the entire utility portion of the strap.

For specific requirements, it is possible to vary interval 33 between the transverse support elements, for example, a small interval in the central portion and a larger interval at the extremities of the utility portion of the strap.

Preferably, the strap consists of two superimposed bands, such as bands of textile material joined together and attached with a seam. These bands form upper tension band 34 and lower band 35 for holding transverse support elements 26.

Lower maintenance band 35 may be continuous, i.e., the same length as upper tension band 34, or it may be present only in the areas with transverse support elements 26, or it may consist only of segments near each transverse support element.

A loop, such as loop 36, formed of a portion of the lower band and partially surrounding rod 27 of each transverse support element 26, is used for maintenance, with the other portion of rod 27 being covered by upper tightening band 34.

To further maintain transverse support elements 26, each loop 36 holding a transverse support element is defined by two parallel, transverse seams along the central portion of rod 27, on either side thereof.

Thus, transverse support elements 26 are always located below upper tension band 34, ensuring better maintenance and support for the upper band.

FIG. 7 shows how rod 27 of each transverse support element 26 flexes and how extremities 28, 29 separate slightly along the diagonal when these elements are subjected to pressure from a tightening of the strap.

Due to the plasticity of the material forming transverse support elements 26, they deform in the manner shown in FIG. 7. Flexing rod 27 exerts a supporting force against the tire through lower maintenance band 35, causing the extremities 28, 29 to separate diagonally and tightening the hold on the unit.

The areas where rod 27 and the support element extremities are recessed increase contact surface against the tire, and thereby improve lateral maintenance.

What is claimed is:

1. A flexible security link (2) for securing a vehicle, having at least one wheel (4), to a carrying surface (7) via the at least one wheel (4), said security link comprising:

a flexible strap (1) having transverse sides and opposed ends for connection to anchor elements and securing the flexible strap (1) to two fixed points on the carrying surface (7), the strap (1) having a plurality of transverse immobilizing structures (26) supported therealong, each of the plurality of transverse immobilizing structures (26) having transversely projecting extremities (28, 29) projecting transversely beyond each transverse side of the strap (1) for contacting with a tread (6) of a tire (5) mounted on the wheel (4) to be secured;

wherein each of the plurality of transverse immobilizing structures (26), held by the flexible strap (1), rotates freely with respect to the flexible strap and the transversely projecting extremities (28, 29) projecting transversely beyond either side of the strap (1) to contact the tread (6) of the tire (5).

2. The security link according to claim 1, wherein the flexible strap (1) maintains each of the transverse immobilizing structures (26) parallel to one other.

3. The security link according to claim 1, wherein the plurality of transverse immobilizing structures (26) are spaced uniformly along a tire engaging portion of the strap (1).

4. The security link according to claim 1, wherein a first of the two opposed ends of the flexible strap supports an anchor element and a second of the two opposed ends of the flexible strap supports a manual tightening device for securing the flexible strap (1) to the carrying surface (7).

5. The security link according to claim 4, wherein the manual tightening device comprises a catch, a handle and an anchor element.

6. The security link according to claim 4, wherein a return ring (23) is anchorable to the carrying surface (7) by a hook (24) and the return ring (23) is located adjacent the manual tightening device.

7. A flexible security link (2) for securing a vehicle, having at least one wheel (4), to a carrying surface (7) via the at least one wheel (4), said security link comprising:

a flexible strap (1) having transverse sides and opposed ends for connection to anchor elements and securing the flexible strap (1) to two fixed points on the carrying surface (7), the strap (1) having a plurality of transverse immobilizing structures (26) supported therealong, each of the plurality of transverse immobilizing structures (26) having transversely projecting extremities (28, 29) projecting transversely beyond each transverse side of the strap (1) for contacting with a tread (6) of a tire (5) mounted on the wheel (4) to be secured;

wherein each of the plurality of transverse immobilizing structures (26), held by the flexible strap (1), rotates freely with respect to the flexible strap and the transversely projecting extremities (28, 29) projecting transversely beyond either side of the strap (1) to contact the tread (6) of the tire (5); and each of said plurality of transverse immobilizing structures (26) further comprises a rectilinear central portion (27) which has a cylindrical rod shape, each rectilinear central portion (27) supports a pair of the opposed transversely projecting extremities (28, 29), and the transversely projecting extremities (28, 29) are generally cylindrical and larger in diameter than the rectilinear central portion (27).

8. The security link according to claim 7, wherein the transversely projecting extremities (28, 29) are all identical to one another.

9. The security link according to claim 8, wherein the transversely projecting extremities (28, 29) are ringed structures.

10. The security link according to claim 9, wherein opposed ends of the transversely projecting extremities (28, 29) support two rings of said ringed structures.

11. The security link according to claim 9, wherein opposed ends of the transversely projecting extremities (28, 29) support three rings of said ringed structures.

12. The security link according to claim 7, wherein the flexible strap (1) is formed by a lower maintenance band (35) and an overlapped upper tension band (34) which together define a plurality of loops (36) therebetween, and each of the plurality of loops encompass a corresponding rectilinear central portion (27) of one of the plurality of immobilizing structures (26).

13. The security link according to claim 12, wherein the lower maintenance band (35) is connected to the upper tension band (34) adjacent each one of the plurality of immobilizing structures (26).

14. A flexible security link (2) for securing a vehicle, having at least one wheel (4), to a carrying surface (7) via the at least one wheel (4), said security link comprising:

a flexible strap (1) having transverse sides and opposed ends for connection to anchor elements and securing the flexible strap (1) to two fixed points on the carrying surface (7), the strap (1) having a plurality of transverse immobilizing structures (26) supported therealong, each of the plurality of transverse immobilizing structures (26) having transversely projecting extremities (28, 29) projecting transversely beyond each transverse side of the strap (1) for contacting with a tread (6) of a tire (5) mounted on the wheel (4) to be secured;

wherein each of the plurality of transverse immobilizing structures (26), held by the flexible strap (1), rotates freely with respect to the flexible strap and the transversely projecting extremities (28, 29) projecting transversely beyond either side of the strap (1) to contact the tread (6) of the tire (5); and the plurality of transverse immobilizing structures (26) are divided into a plurality of groups (25) and each of the plurality of groups (25) is separated from an adjacent group (25) by a constant interval.

* * * * *